(12) United States Patent
Wu et al.

(10) Patent No.: US 11,449,660 B1
(45) Date of Patent: Sep. 20, 2022

(54) METHOD TO PERFORM SECONDARY-PG AWARE BUFFERING IN IC DESIGN FLOW

(71) Applicant: Synopsys, Inc., Mountain View, CA (US)

(72) Inventors: Jin Wu, San Jose, CA (US); Renu Mehra, Sunnyvale, CA (US); Sabyasachi Das, San Jose, CA (US); Ben Mathew, Plano, TX (US); Kunming Ho, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/198,132

(22) Filed: Mar. 10, 2021

Related U.S. Application Data

(60) Provisional application No. 62/987,869, filed on Mar. 10, 2020.

(51) Int. Cl.
| | | |
|---|---|---|
| *G06F 30/00* | (2020.01) | |
| *G06F 30/398* | (2020.01) | |
| *G06F 30/394* | (2020.01) | |
| *G06F 30/392* | (2020.01) | |
| *G06F 111/04* | (2020.01) | |

(52) U.S. Cl.
CPC .......... *G06F 30/398* (2020.01); *G06F 30/392* (2020.01); *G06F 30/394* (2020.01); *G06F 2111/04* (2020.01)

(58) Field of Classification Search
CPC .... G06F 30/398; G06F 30/392; G06F 30/394; G06F 2111/04
See application file for complete search history.

(56) References Cited

U.S. PATENT DOCUMENTS

| | | | | |
|---|---|---|---|---|
| 8,205,182 B1 * | 6/2012 | Zlatanovici | ........... | G06F 30/327 716/125 |
| 8,423,946 B1 * | 4/2013 | Jin | .......... | G06F 30/30 716/133 |
| 8,451,026 B2 * | 5/2013 | Biggs | .................... | G06F 30/392 716/120 |
| 8,683,419 B1 * | 3/2014 | Hines | .................... | G06F 30/327 716/133 |
| 8,806,410 B2 * | 8/2014 | Kumar | .................. | G06F 30/327 716/133 |
| 9,443,048 B2 * | 9/2016 | Berry | .................... | G06F 30/392 |
| 9,536,038 B1 * | 1/2017 | Quinton | .............. | G06F 30/3312 |
| 9,773,079 B2 * | 9/2017 | Taskin | .................. | G06F 30/367 |
| 10,204,180 B1 * | 2/2019 | Huang | .................. | G06F 30/398 |

(Continued)

FOREIGN PATENT DOCUMENTS

| | | | | | |
|---|---|---|---|---|---|
| CN | 103577634 A | * | 2/2014 | .......... | G06F 30/398 |
| JP | 2002217300 A | * | 8/2002 | | |

*Primary Examiner* — Naum Levin
(74) *Attorney, Agent, or Firm* — Nicholson De Vos Webster & Elliott LLP; Judith Szepesi

(57) ABSTRACT

A system to generate a design of an integrated circuit, the system comprising a memory and a processor, the processor to define a plurality of voltage area regions (VARs), based on an availability of one or more of a primary power source and one or more secondary power sources. The processor further to constrain placement and/or routing of an element in the design of the integrated circuit within a voltage area region of the plurality of voltage area regions defined by secondary power/ground (PG) constraints based on power requirements of the element.

20 Claims, 16 Drawing Sheets

(56) References Cited

U.S. PATENT DOCUMENTS

| | | | |
|---|---|---|---|
| 10,242,145 B1* | 3/2019 | Anand | G06F 30/394 |
| 10,318,694 B2* | 6/2019 | Chung | G06F 30/39 |
| 10,430,541 B2* | 10/2019 | Ke | H03K 19/00315 |
| 10,540,470 B1* | 1/2020 | Kollaritsch | G06F 30/394 |
| 10,657,302 B1* | 5/2020 | Devyldere | G06F 30/394 |
| 11,068,237 B1* | 7/2021 | Ware | G06F 7/502 |
| 2013/0073878 A1* | 3/2013 | Jayasimha | G06F 1/3287 |
| | | | 713/300 |
| 2013/0111425 A1* | 5/2013 | Kumar | G06F 30/327 |
| | | | 716/104 |
| 2015/0220675 A1* | 8/2015 | Zheng | G06F 30/398 |
| | | | 716/126 |
| 2016/0180012 A1* | 6/2016 | Senapati | G06F 30/3323 |
| | | | 716/109 |
| 2017/0011139 A1* | 1/2017 | Arts | G06F 30/327 |
| 2017/0337315 A1* | 11/2017 | Ke | H03K 19/00315 |
| 2018/0144086 A1* | 5/2018 | Chung | G06F 30/398 |
| 2019/0121929 A1* | 4/2019 | Chen | G06F 30/392 |
| 2019/0287906 A1* | 9/2019 | Kerr | H01L 23/5286 |
| 2020/0372196 A1* | 11/2020 | Bhowmick | G06F 30/3323 |

* cited by examiner

Two regions with VDD2 mesh in VA1

VDD2 straps in VA1

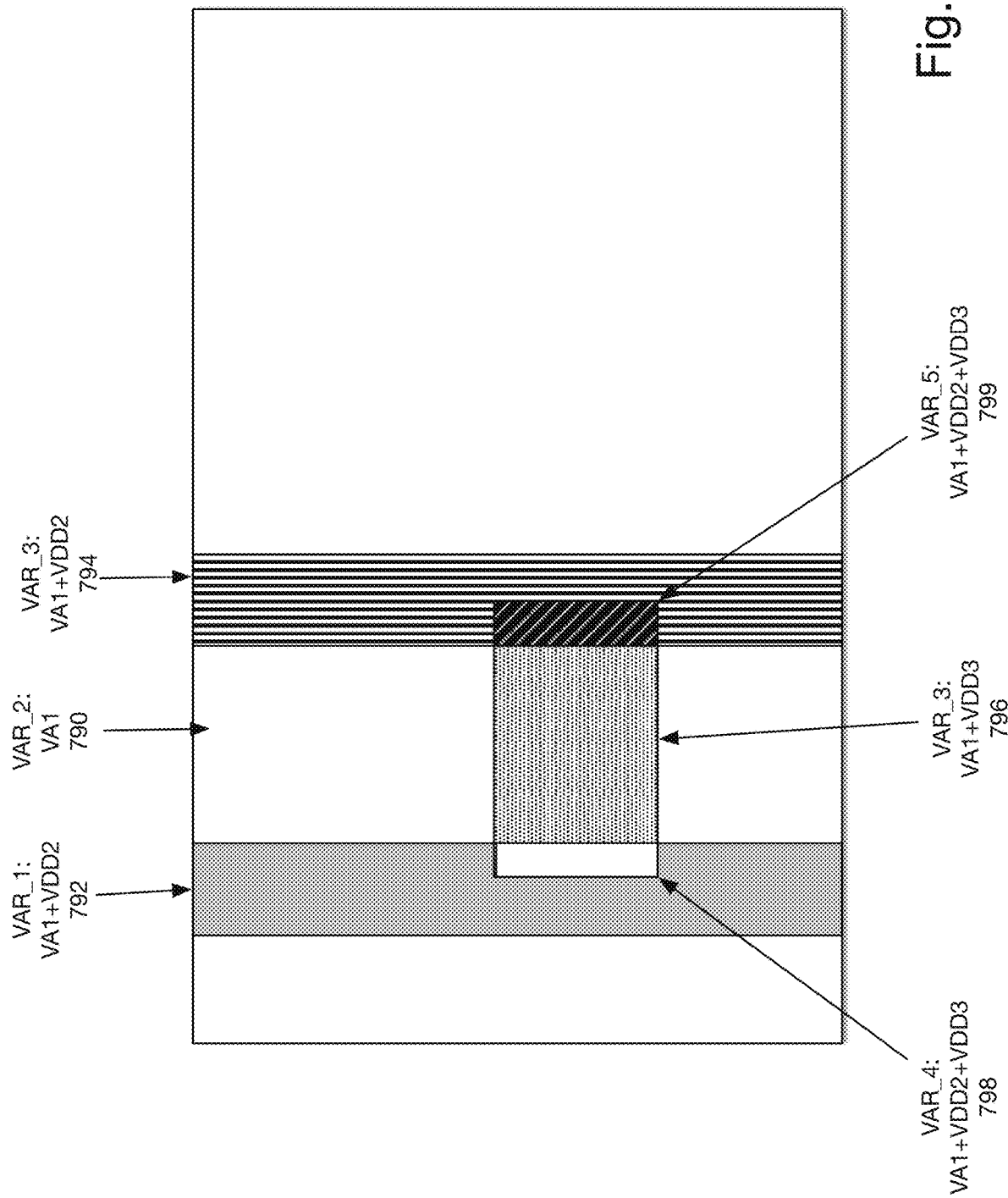

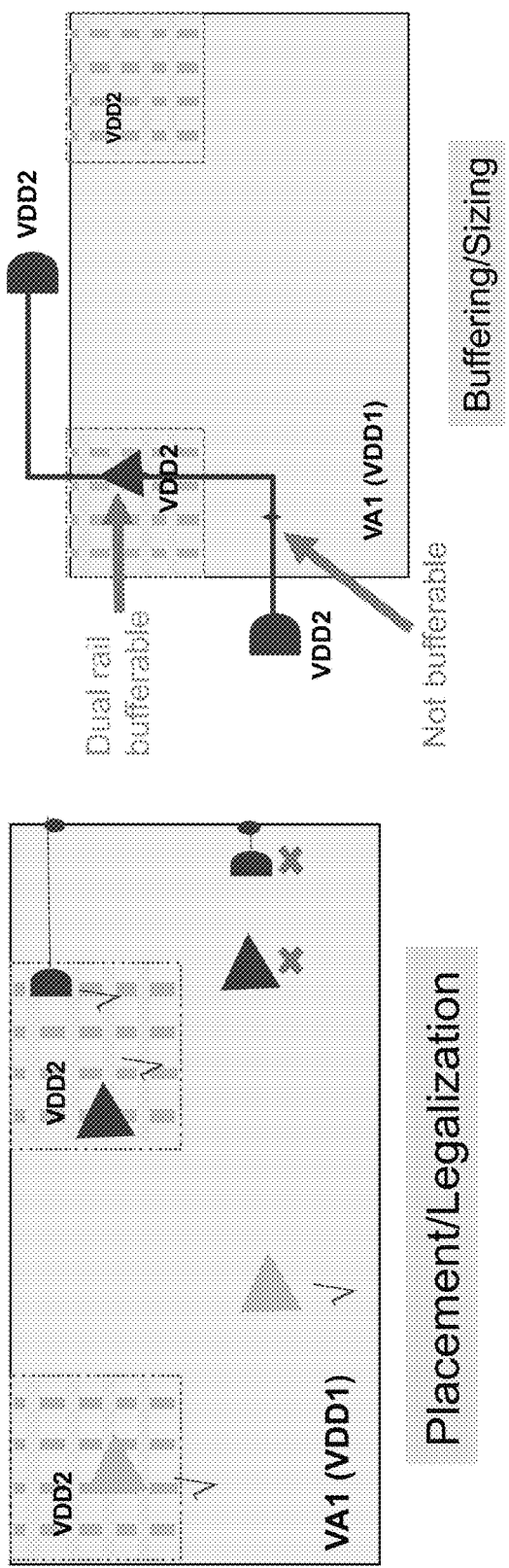
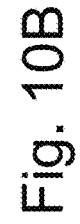
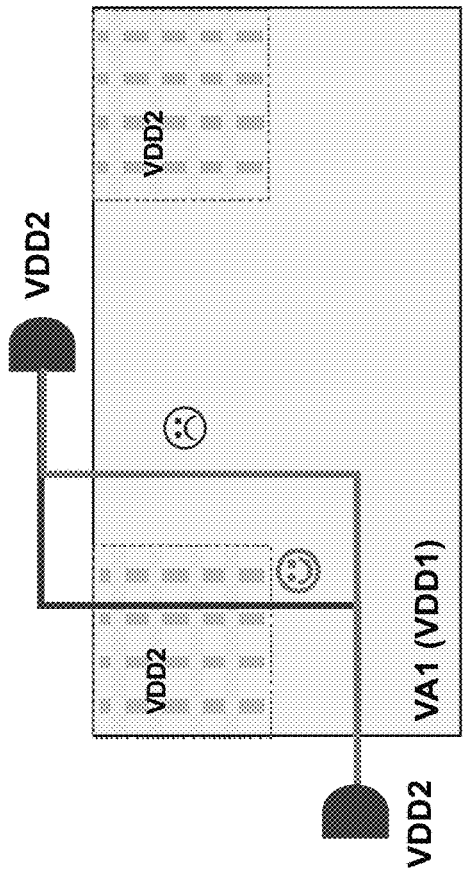
Fig. 10A  Placement/Legalization
Fig. 10B  Buffering/Sizing
Fig. 10C  Topology Generation

METHOD TO PERFORM SECONDARY-PG AWARE BUFFERING IN IC DESIGN FLOW

TECHNICAL FIELD

The present disclosure relates to electronic design automation (EDA) tools and, in particular, power and ground awareness in circuit design.

BACKGROUND

In a typical modern integrated circuit, typical cells have a single power (P) pin and a single ground (G) pin that are connected to the primary power supply of the power domain. However, advanced low power designs look to reduce dynamic and/or leakage power by defining regions of the design as a power domain to provide advanced low power techniques, which often require secondary power and ground pins associated with a low power domain. To facilitate such multi-power domain design, Unified Power Format (UPF), an Institute of Electrical and Electronics Engineers (IEEE) standard, is often used to specify power intent in power optimization of an integrated circuit using advanced electronic design automation.

Sometimes, the functionality of some cells in one power domain is incompatible with the primary supply of the main power domain due to differences in the on/off state. In these situations, dual-rail cells are used, which have a backup supply pin connected to a secondary supply network. Dual-rail cells need to be placed near secondary power straps, and the backup supply pin is routed to the strap when designing the circuit.

In current design methodology, there are not enough routing resources to have all secondary power supplies available throughout the design. Thus, the secondary sources are available only in a subset of the design. As a result, dual-rail cells are often placed too far away from the secondary source by automatic place and route tools, resulting in longer PG wire lengths and routing congestion within the cell. As a result, there is a significant IR drop (voltage drop across a resistance) in the secondary PG routes.

Circuit designers often resort to manual design effort to address these issues, which creates an increased risk of introducing changes to circuit timing. As a result, designs often require significant additional development time to ensure timing convergence. In other instances, designers have resorted to implementing complicated script-based manual methods to work around the placement challenge.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 7D illustrates another exemplary layout of voltage areas.

FIG. 10A illustrates one embodiment of how the power/ground constraint system data is utilized in placement/legalization.

FIG. 10B illustrates one embodiment of how the power/ground constraint system data is used in buffering/sizing.

FIG. 10C illustrates one embodiment of how the power/ground constraint system data is used in topology generation.

DETAILED DESCRIPTION

Aspects of the present disclosure relate to secondary power and ground aware buffering in integrated circuit design. The system defines a plurality of voltage area regions, based on the availability of a set of power sources. The voltage area regions have one or more power sources available. In one embodiment, these voltage area regions are non-overlapping. The voltage area regions are made available to placement and routing and other tools, in one embodiment, to constrain placement and/or routing of elements of the integrated circuit within a voltage area region based on the element's power requirements.

Advantages of the present disclosure include, but are not limited to providing voltage area regions specifying the available power sources, which ensures that the system can place and route appropriately in a voltage area, to ensure access to the power supplies used by the element, to address voltage drop (IR drop) and electromigration (EM) considerations.

Figure 1:
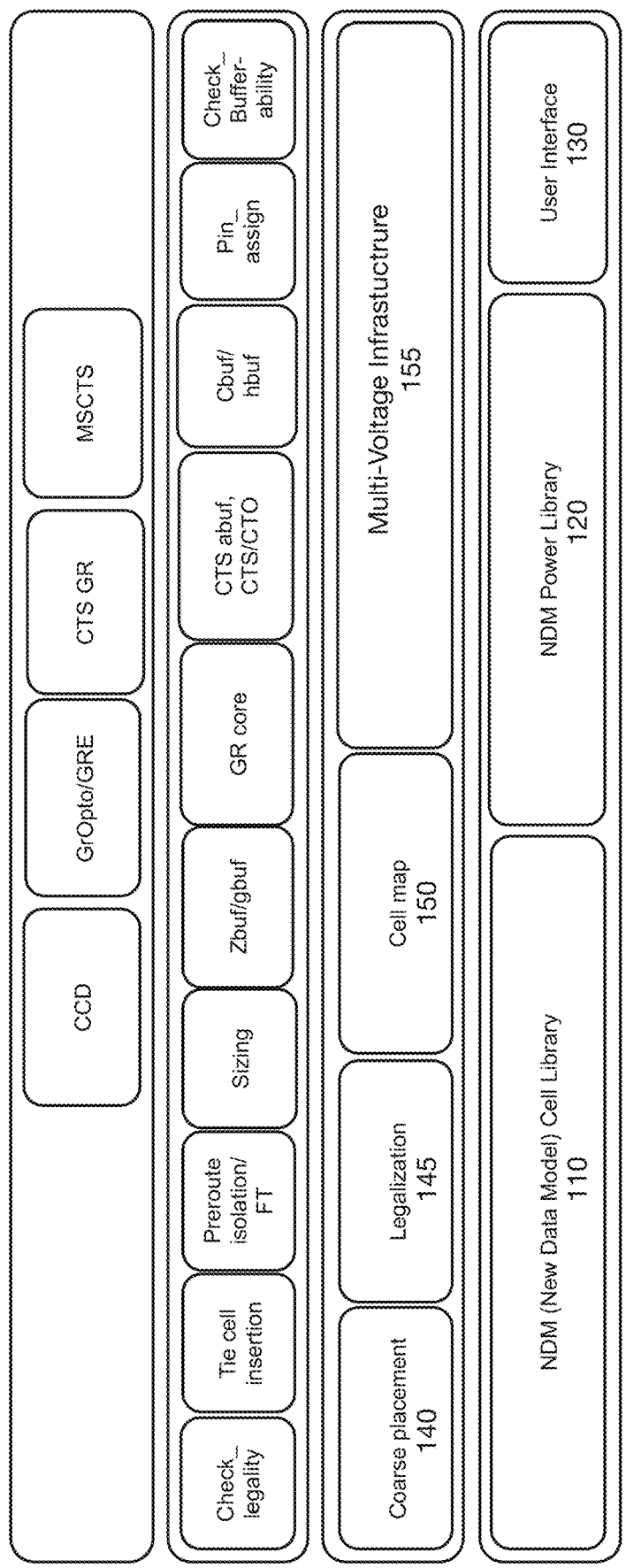
FIG. 1 is a block diagram of one embodiment of an EDA system, including a new data model power library.

FIG. 1 is a block diagram of one embodiment of an EDA system, including a new data model power library. The base of the design system includes a cell library 110, a power library 120, and a user interface 130. The other elements of the EDA system utilize data from the libraries 110, 120. The coarse placement 140, legalization 145, cell mapping 150, and multi-voltage infrastructure 155 all utilize cell data and power data from the libraries 110, 120, in one embodiment.

Figure 2:
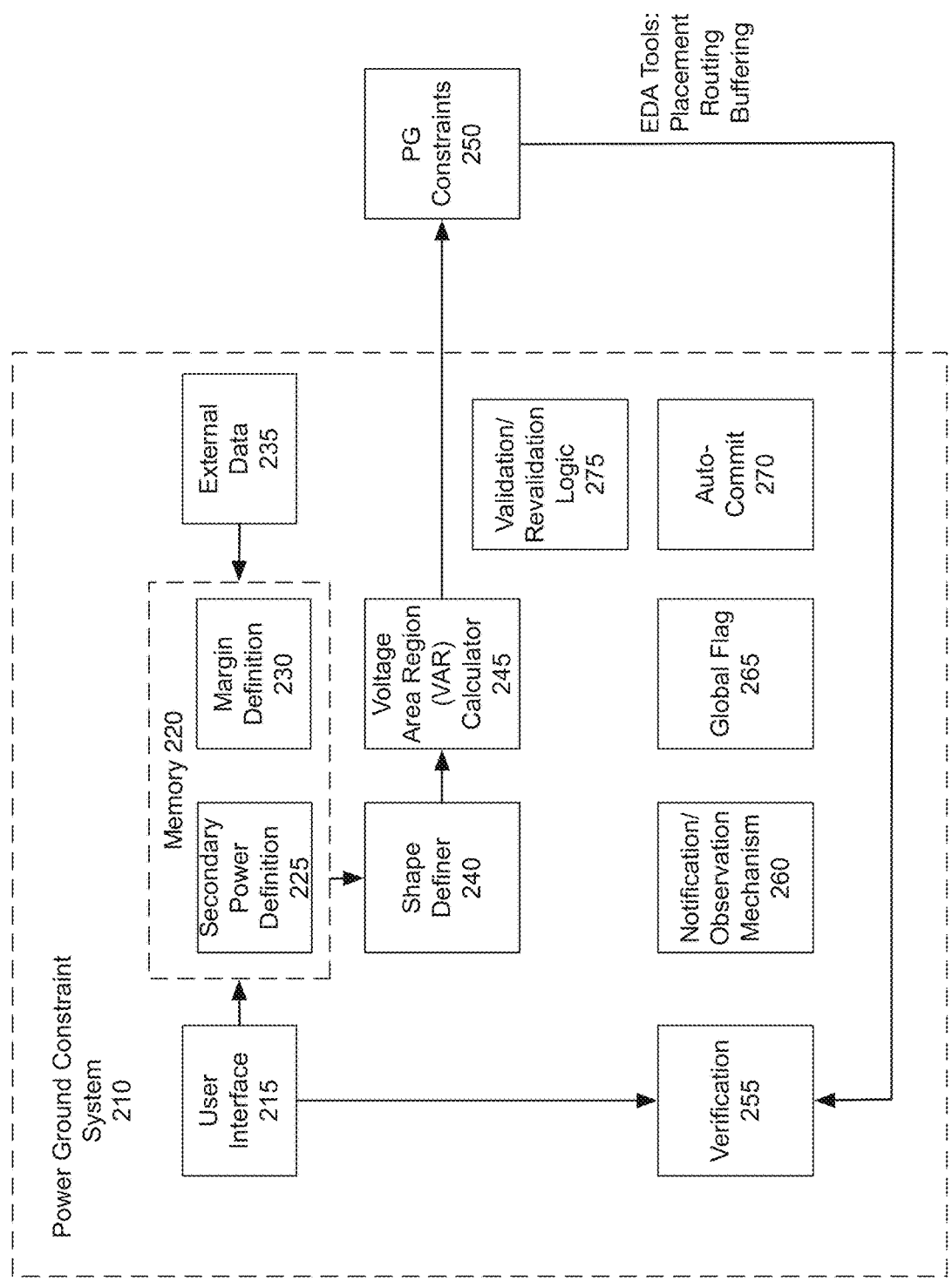
FIG. 2 is a block diagram of one embodiment of the power/ground constraint system.

FIG. 2 is a block diagram of one embodiment of the power/ground constraint system. The power/ground constraint system 210 in one embodiment is part of the EDA system. The system includes a user interface 215, enabling a user to define constraints. In one embodiment, the system includes a memory 220 which stores the power strap locations 225 and margins 230. Power strap locations 225 define the segments of the voltage area in which a secondary power source is available. Power straps which define the power strap locations may be any shape. The margin is a distance from the power strap location which is included in the secondary power/ground voltage area regions (PG VARs).

Figure 5B:
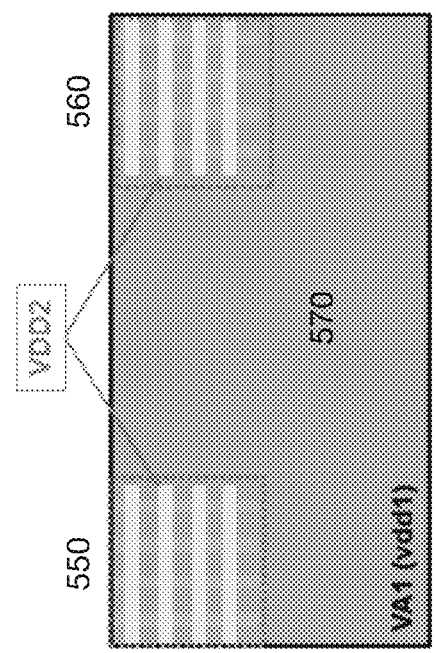
FIG. 5B illustrates another configuration for the secondary power VARs, in blocks.
Figure 5A:
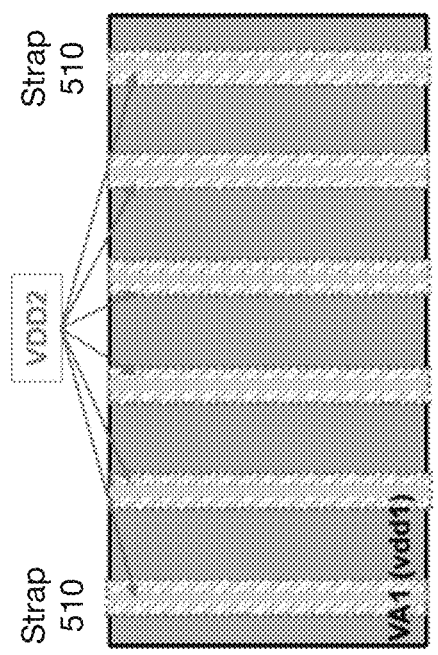
FIG. 5A illustrates one configuration for secondary power voltage area regions (VARs), with straps.

Power strap locations 225 are defined by the physical presence of the corresponding power strap in one of the layers in the circuit. As shown in FIGS. 5A and 5B, secondary power sources are generally available either in vertical lines 510, or regions 550, 560. Both are referred to as "power straps" in the present application. Other arrangements may be used. However, the power strap locations 225 define the physical coordinates in which the particular power supply is available. A large circuit design may include five, ten, or even fifty or more power straps, and any number of separate secondary power supplies. The power strap locations 225 with the associated margins 230, provide the definition of the PG VARs where each of the secondary power supplies are available, in one embodiment.

Figure 6A:
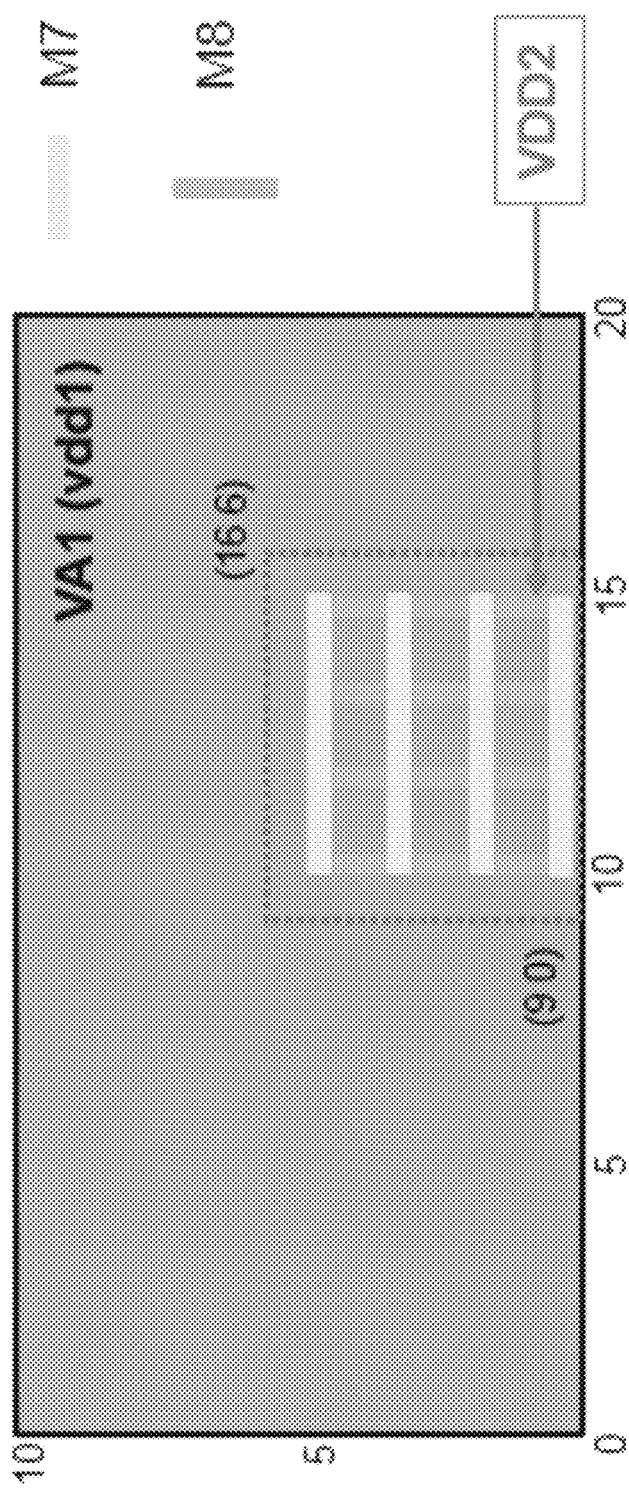
FIG. 6A illustrates one embodiment of a region definition for a secondary power VAR.
Figure 6B:
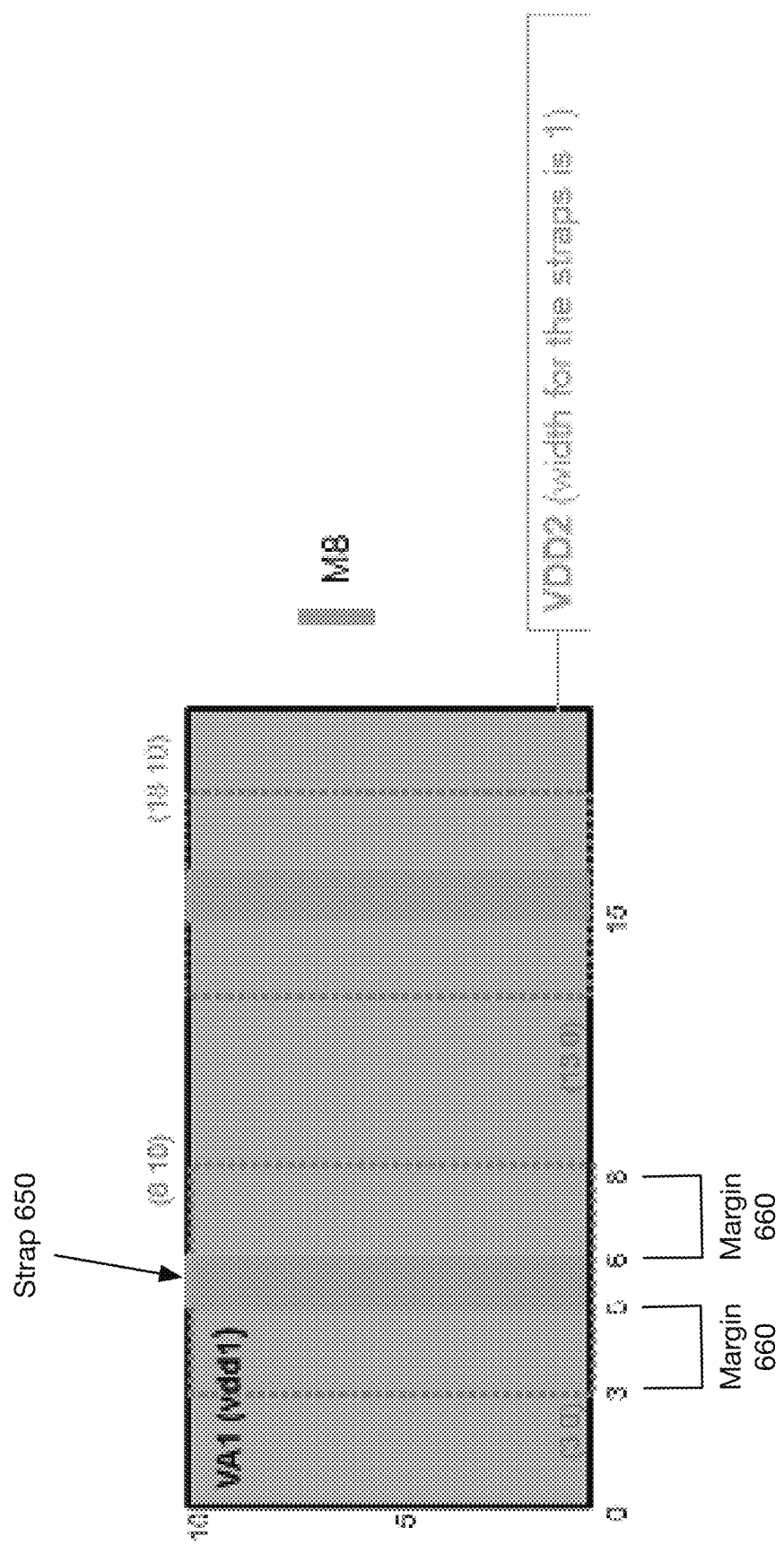
FIG. 6B illustrates the margins used for an exemplary location of a secondary power strap.

The margins define the distance from the actual power strap location, where elements that utilize the power supply can be placed. FIG. 6A illustrates a region, and its margins. FIG. 6B illustrates the power strap location 650 of the power supply, and the margins 660, on either side of the power strap location. In this illustration, the margins are 2 nm from the strap. Margins may range from 1 nm to 5 nm. The size of the margins, in one embodiment, may be defined by the user, via user interface 215. Any element placed within the margin would need to be coupled to the power supply strap, via a connection.

Figure 6C:
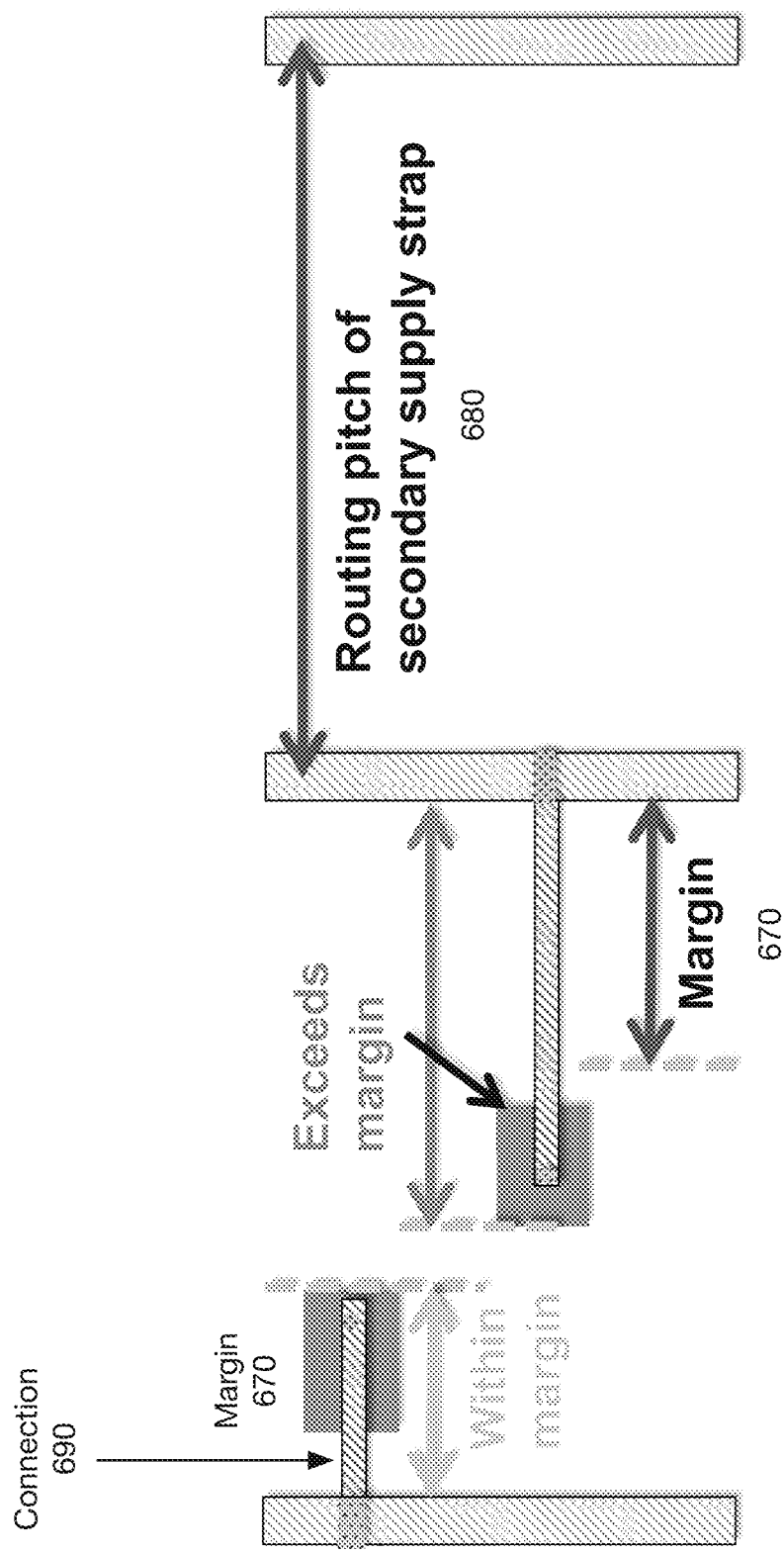
FIG. 6C illustrates the use of the margins to define the region in which elements using the secondary supply strap can be positioned.

FIG. 6C illustrates the margins and pitch between the straps. The margin 670 defines the maximum length of a connection 690. In one embodiment, the margin 670 is less than ½ of the routing pitch 680 of the secondary supply straps, e.g. there is a zone between two straps in which the power supply is not available. Similarly, for PG VARs of different shapes, there is a zone beyond the edges of the PG VAR. In one embodiment, the routing pitch 680 is dependent on the design. Routing pitch 680 can be as close 4 nm and as large as 30 nm, while the margin 670 may range between 1 nm and 5 nm.

Returning to FIG. 2, the secondary power definition 225 and margin definition 230 may be received from the user via user interface 215, in one embodiment. In another embodiment, the data may be external data 235. In one embodiment, the external data 235 may be provided by other elements of the EDA system. The margin may be determined by the system based how much IR drop and voltage drop margin is allowed by the design. Longer connecting wires will result in higher voltage drops and also longer connecting wires take up area in the chip and cause congestion. In one embodiment, the margins may differ for different power sources. For example, a low voltage power source may have a smaller margin.

Figures 7A, 7B:
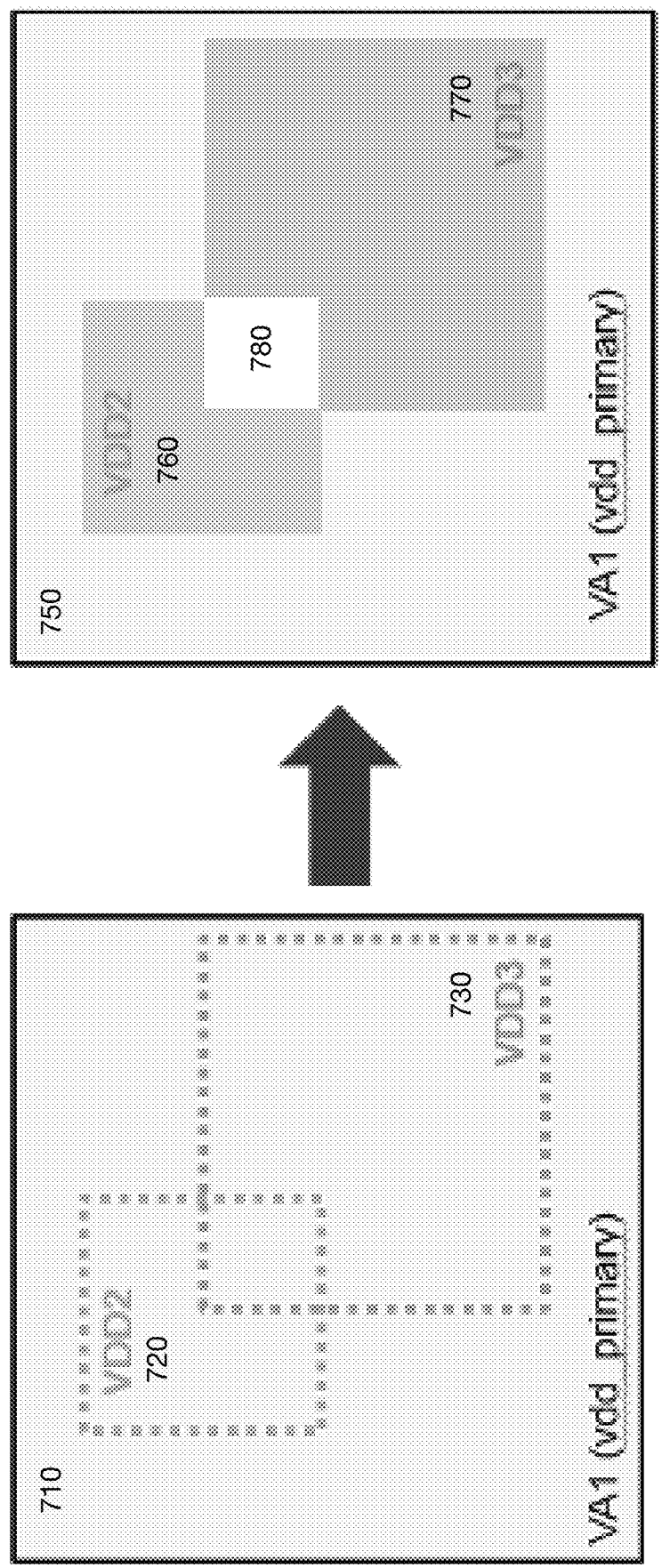
FIG. 7A illustrates one embodiment of a voltage area with two secondary power regions.
FIG. 7B illustrates one embodiment of the four voltage area regions defined by the system of FIG. 7A.

The shape definer 240 defines the shape of the voltage area region, which includes the area of the power strap plus its associated margin. FIG. 7A illustrates an exemplary set of shapes defined by the shape definer. Although these shapes are illustrated as intersecting squares, the shapes may be any shape, as defined by the power strap and margin.

The voltage area region calculator 245 identifies the two or more voltage area regions (VARs). Each voltage area region includes the main power source, and one or more and the secondary PG VARs. The secondary PG VAR is the voltage area region where only certain secondary power supplies are available. Default voltage area region is the remaining area within the voltage area. Each VAR is a contiguous region in which the same set of power sources are available.

FIG. 7B illustrates four separate VARs 750, 760, 770, and 780. Each of the VARs has a set of associated power sources. For example, VAR 770 has VA1 (Vdd_primary) and VDD3. VAR 780 has VA1, VDD2, and VDD3. Thus, the voltage area regions are not regular rectangles, but rather shapes defined by the overlapping areas of the available power supplies. Although the drawing illustrated only has a single VAR for the availability of a set of power supplies, in a real implementation, as shown in FIG. 7D, there may be multiple VARs with the same associated PG VARs. In one embodiment, each VAR is contiguous, and there may be multiple non-contiguous VARs which have the same set of PG VARs. The VAR region information is stored as power/ground (PG) constraints 250, in one embodiment. The PG constraints 250 are then used by other parts of the EDA system. The PG constraints, in one embodiment, are used by the electronic design automation (EDA) system in placement, routing, and buffering to ensure that the circuit layout honors the constraints of the power source availability.

In one embodiment, during other parts of the EDA process, the PG constraints system 210 may provide verification 255 to determine whether a proposed placement is valid, whether a proposed connection is bufferable, and topology and layout support. Verification 255 in one embodiment uses the PG constraints 250, as will be described below.

In one embodiment, the system further provides a notification/observation mechanism 260, which determines whether changes to the voltage areas or other aspects of the design require revalidation 275 of the data in PG constraints 250. In one embodiment, a global flag 265 is used to mark the data valid, that is usable for verification 255, or requiring revalidation. The notification/observation mechanism 260 resets global flag 265 when it determines that revalidation is needed. This notifies all the systems that rely on the PG constraint data that the data should be revalidated before further use. In one embodiment, the system further includes auto-commit 270, which triggers revalidation 275 of the data as well.

Figure 3:
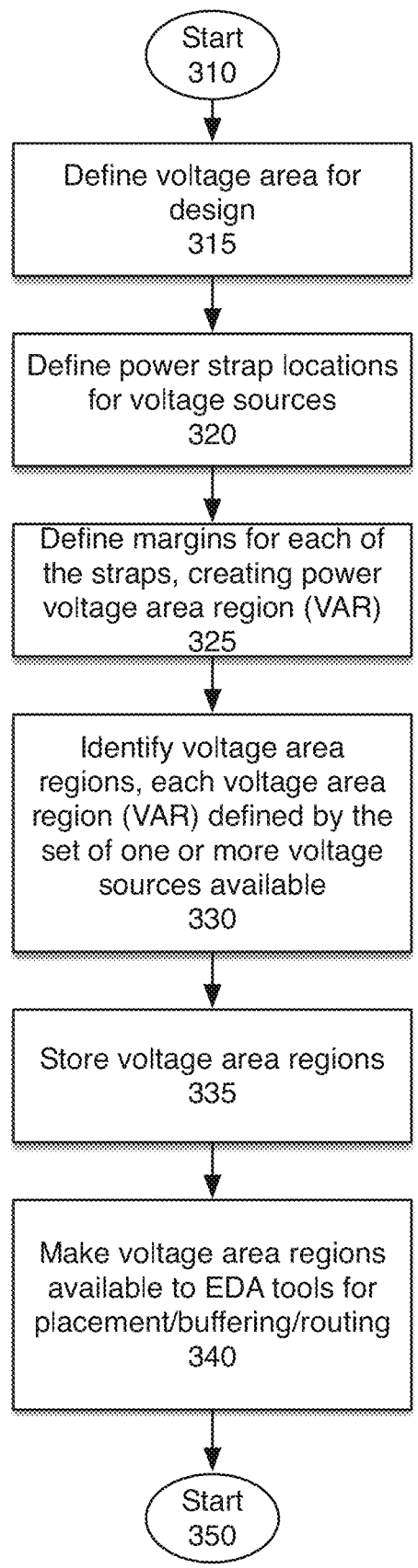
FIG. 3 is a flowchart of one embodiment of using the power/ground constraint system.

FIG. 3 is a flowchart of one embodiment of using the power/ground constraint system. The process starts at block 310. At block 315, the voltage area for the system is defined. The voltage area is defined, in one embodiment, by a circuit or subarea of the circuit in which a primary power supply is available.

At block 320, the supply strap locations, or areas of secondary voltage sources, is defined. A circuit may include as many as 30 or 40 separate secondary voltage sources.

At block 325, the system defines margins for each of the straps. In one embodiment, the margin defines the distance from the actual power strap location, where the secondary power is considered available via a connective wiring. In one embodiment, a different margin may be defined for each strap. In another embodiment, the margin may be the same for all secondary power sources, or a set of secondary power sources. The power strap location and it associated margin defines the PG VAR. In another embodiment, the system may allow the PG VAR to be defined directly, rather than based on a power strap location and margin. This may be useful to enable the definition of VARs when the straps are not yet created.

At block 330, voltage area regions are defined, where each voltage area region is a contiguous region in which a particular set of power supplies is available.

At block 335, the voltage area region data is stored. In one embodiment, this data is stored in memory. The voltage area region defines a set of secondary power/ground (PG) constraints, which are used by other EDA tools.

At block 340, the data is made available to other EDA system tools, enabling those tools to respect the voltage source availability defined by the VARs, in EDA design including one or more of placement, routing, and buffering of elements based on the power sources used by the elements. Thus, the system ensures that an element which requires VDD3 is restricted to areas in which VDD3 is available. The process then ends at block 350.

Embodiments provide modules for placement and routing of "coarse" style of secondary PG structures, such as the exemplary structures illustrated in FIGS. 5A and 5B, in which the available regions of secondary PG are defined as a controllable set of shapes (clustering into handful of regions, or straps). The design goal is to avoid using a dense mesh for the secondary PG structure, which could potentially generate a very large number of disjoint voltage regions.

In accordance with an embodiment, leaf cells are placed by a placement module inside the shape(s) (or area of the voltage area (VA)) specified for the power supply (e.g., Vdd2) for each leaf cell. A 'leaf cell' means any component that occupies space in the core area of an integrated circuit device. Examples of a leaf cell include a flip flop, a standard cell or an IP macro.

Figure 8A:
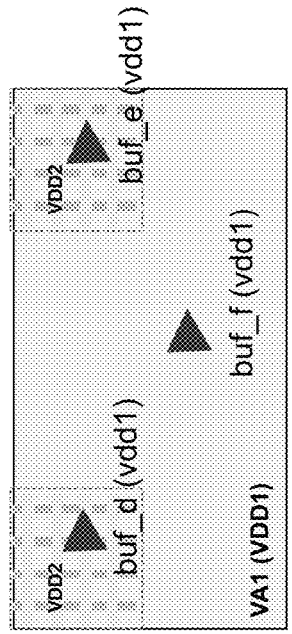
FIGS. 8A-8B illustrate positioning for a buffer correctly and incorrectly, based on power constraints.
Figure 8B:
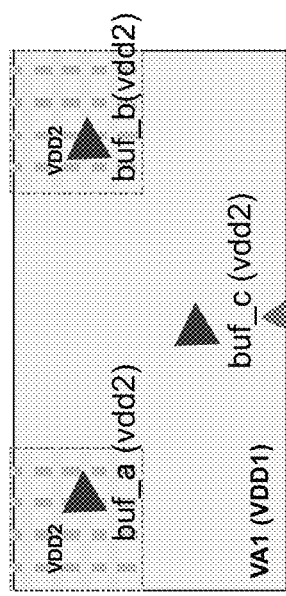

FIGS. 8A-8D illustrate an example of how this limitation is implemented. To illustrate, the placement module will not allow "buf_c" (powered by VDD2) to be placed in voltage area region VA1, which provides only VDD1 and where VDD2 is not available, because "bufc" is powered by VDD2, and thus should be placed within a voltage area region where VDD2 is present. Thus, the placement indicated in FIG. 8A is an error because "bufc" is NOT placed inside the red-dashed line shapes corresponding to the area where VDD2 is available.

For leaf cells connected to only to the top-level power supply (VDD1) domain in the VA, such cells, subject to other constraints such as timing, can be placed anywhere in the voltage area. For example, in FIG. 8B, buf_d, buf_e and buf_f are all connected to VDD1 and can be placed anywhere in a VA whose primary power is VDD1 and VDD1 is available everywhere in the VA.

Figure 8C:
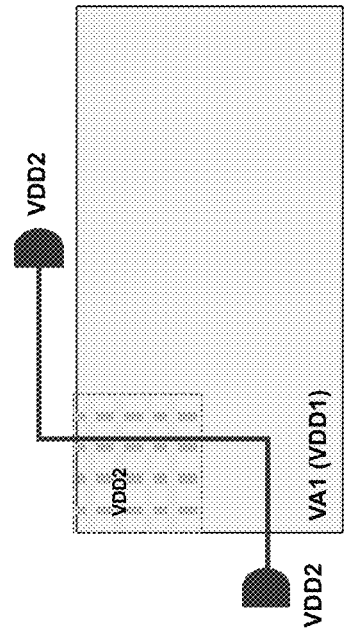
FIGS. 8C-8D illustrates positioning of a wire correctly and incorrectly, based on power constraints.
Figure 8D:
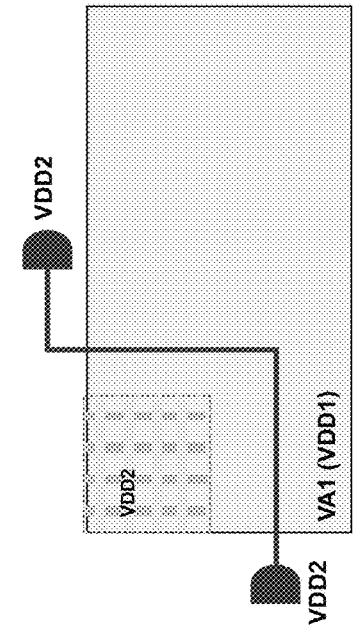
Figure 9A:
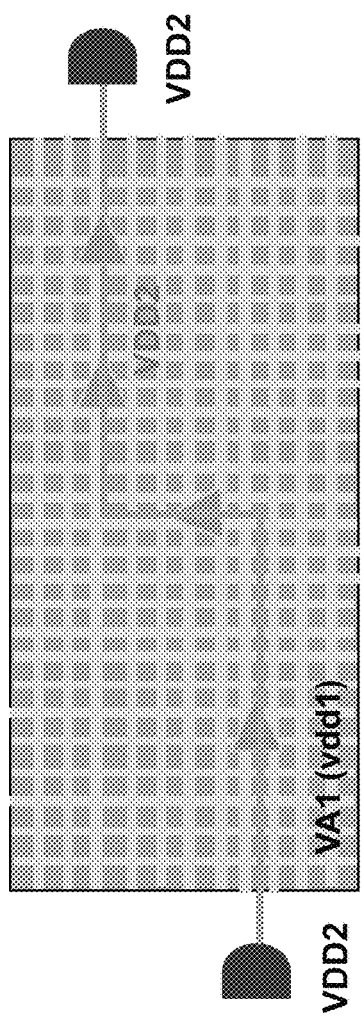
FIG. 9A illustrates the connection of a wire including buffers without secondary power constraints.
Figure 9B:
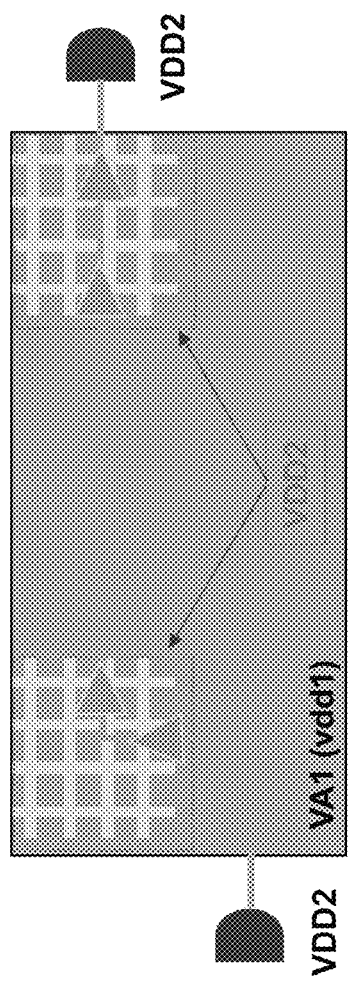
FIG. 9B illustrates the connection of the same wire including the same number of buffers, taking the secondary power constraints into consideration.

When routing connectors between cells, modules of the present disclosure implement rules to allow conductors to go through secondary PG regions where the desired supply for buffering is available. As illustrated in FIG. 8C, when a buffer or inverter is added to a routing path that needs to be connected to the secondary power (e.g., Vdd2), the routing needs to be routed through the corresponding secondary PG region of the VA. Thus, FIG. 8C shows better routing because the path goes through the shape with VDD2 available. The route shown in FIG. 8C provides the chance to add buffers that require VDD2 which is available in the red-dash line region. In contrast, the route shown in FIG. 8D cannot be buffered inside the whole VA1 and is poor path choice because it will not be possible to add any buffers along the route. FIG. 9A shows that without the secondary PG constraints, buffers are placed throughout the main voltage area, even though the elements require VDD2, which is not available throughout the voltage area. In contrast, when the secondary PG constraints are properly defined, as shown in FIG. 9B, the buffers are placed within the defined voltage area regions, ensuring that the buffers have access to VDD2.

To illustrate, when adding buffers or inverters along a route, the selected location must follow the rule to place leaf cells that require access to the secondary power to be placed inside the secondary PG region. In FIG. 8A, buf_b is connected to VDD2 but if placed outside the shape of the secondary PG region, it is considered to be a placement error.

In one embodiment, physically, a supply with secondary PG placement constraints will be only available in the shapes specified by the user or derived by the tool based on user's inputs. For supply without secondary PG placement constraint, it will be available in the whole VA when the supply is available in the domain of this VA.

FIGS. 7A and 7B illustrate an example with three power supplies. FIG. 7A is an illustration of the overlapping areas of the secondary power sources. A secondary PG placement constraint for VDD2 is the first line box 720 inside a VA 710 and a secondary PG placement constraint for VDD3 is the second line box 730, also inside the VA 710.

The voltage area regions shown in FIG. 7B include a first area 760 that indicates a secondary PG region for VDD2 and Vdd_primary which is the primary power supply in the VA. The second area 780 is a region where VDD2, VDD3 and Vdd_primary are all available power supplies. The third area 770 is a region where VDD3 and Vdd_primary power supplies are both available. The fourth area 750 is the area in the VA where only Vdd_pimary is available. The placement module will restrict placement of leaf cells based on the supply voltages required for the leaf cell's operation.

In one embodiment, the system marks a supply net as "UPF (unified power format) available" in a power domain when the supply net is specified as available in a UPF file created in accordance with the IEEE standard for specifying power intent in a design. By default, this supply net is also considered to be physically available in the voltage area that corresponds to the power domain. But in some situations, i.e., straps missing, or where users want to control buffering, the supply nets can become physically unavailable, if a user indicates that explicitly. When a supply net is physically unavailable, the tool will avoid using this supply net during buffering in both synthesis and physical implementation.

If a supply net is specified as physically unavailable in certain voltage areas, all of its functional or electrical equivalent or physically connected supply nets should also be considered as physically unavailable in the same voltage areas.

If a supply net is used by power management (PM) cells (for example, isolation cells), the supply net cannot be specified as physically unavailable in the corresponding VA, even if no straps are available in a VA, and users want to use the straps in the neighborhood VA to connect to these PM cells. A "-margin" can be used to create a VAR with the PM supplies in the current VA for PM cell insertion purpose. Thus, the user may not specify explicit physical availability for supplies that are used for PM cell insertion. In one embodiment, supply nets that a user specifies as physically unavailable cannot be the primary supply of the PG VAR. Thus, when using the present system, there will not be a situation when a supply net is UPF unavailable but physically available. In one embodiment, the physically unavailable supply net can be specified by "create_secondary_pg constraints."

In one embodiment, in the user interface, the name of the supply net specified by -exclude_supply is checked against all UPF supply nets. The to-be excluded supply net is a UPF supply net and is available in corresponding PG VARs. In other words, the new feature, in accordance with a preferred embodiment, only allows the user to specify a UPF available supply net to be physically unavailable.

Embodiments provide a module that provides a new command below, which has two usage models:
create_secondary_pg_placement_constraints
   a. -name <name>
[-exclude_supply supply_name | -supply supply_net]
   a. [-voltage_areas <VA_list>]
   b. [{-layers layer list [-margin size] | -region <region_list>}]

The '-exclude_supply' and '-supply' cannot exist at the same time. In one embodiment, -supply is used to specify a region when the supply is available, while -exclude_supply is used to say that the supply is completely unavailable. Either -supply or -exclude_supply is specified in any create_secondary_pg_placement_constraints. The two options: -exclude_supply and -supply for create_secondary_pg_constraints cannot co-exist. In addition, one of these options has to exist for any create_secondary_pg_constraints. In one embodiment, if neither option exists, an error code will issue and make the create_secondary_pg_constraints command exit with an error indicator. In one embodiment, the error code used will be MV-294. As used herein MV-xxx refers to various error codes that may be used to inform the user of possible error conditions.

In one embodiment, the name for each voltage area region is unique for the whole design and can't be the same as any other secondary_pg_placement_constraints. In one embodiment, the default margin is 0. In one embodiment, when -voltage_areas is not specified, all VAs will be applied (except where the supply is the primary). In one embodiment, either -layers or -region must be specified. In one embodiment, the constraint will be applied to the current block only, not linked physical blocks.

In one embodiment, when -voltage_areas is specified together with -exclude_supply, it tells the tool that the user wants the supply to be excluded from the VAs in the given VA_list. When -voltage areas is not specified, it tells the system that the supply should be excluded from all VAs.

In one embodiment, -layers and -regions are not allowed to be specified together with -exclude_supply in the same constraints. In one embodiment, the system will indicate an error with an error code of MV-295 when either -layers or -regions are specified together with -exclude_supply.

One embodiment of a use-model 1, after PG synthesis is completed, utilizes the command create_secondary_pg_placement_constraints -supply supply_name [-margin size] -layers layer list.

In one embodiment, the PG constraint system will derive the shapes based on the physical wires of the supply on the layer(s) specified. Although the diagrams illustrate a top view, in which the various layers are "overlapping," one of skill in the art understands that the different power straps are implemented on separate layers in an integrated circuit.

One embodiment of use model 2, before the PG synthesis is completed, utilizes the command create_secondary_pg_placement_constraints -supply supply_name [-margin size]-region <region_list>. This may occur (may be early stage in an integrated circuit compiler place and route tool flow or in an RTL compiler) in one embodiment. The final shapes are defined by the region(s) plus the margin(s) specified.

In one embodiment, the secondary PG constraints are specified after the netlist, UPF and physical information, especially the voltage area information, are loaded into the design. In one embodiment, it is acceptable to start the design without secondary PG constraints with -exclude_supply, and later in the flow add secondary PG constraint(s) with -exclude_supply. When there is a create_secondary_pg_placement_constraint, -exclude_supply, in one embodiment, the system will verify:

The excluded supply net is not the primary supply of the VA that it needs to be excluded from.
The excluded supply net is a UPF available supply.

If either of the above checks fails, this create_secondary_pg_placement_constraint -exclude_supply will cause an error and fail.

Once the secondary PG constraint is created, the constraint with -exclude_supply can be reported by report_secondary_pg_placement_constraints. It can also be removed by using remove_secondary_pg_placement_constraints, in one embodiment.

When there is a secondary PG constraint specified, in one embodiment, users issue commit_secondary_pg_placement_constraints so that the secondary PG constraints can be processed and physical availability can be derived. In one embodiment, when an auto_commit feature is available, the user will not be required to issue commit command explicitly. During commit, the EDA system will process all the secondary PG constraints including ones with -supply and the ones with -exclude_supply. In one embodiment, the secondary PG constraints with -supply will be processed first. The secondary PG constraints with -exclude_supply will be processed after all the -supply secondary PG constraints are processed, in one embodiment.

In one embodiment, when there is already a secondary PG constraint with -supply created, then a secondary PG constraint with the same supply specified in -exclude_supply will be ignored. Even if there is no explicit secondary PG constraint with -supply created, as long as a VAR with this supply is derived the secondary PG constraint with the same supply specified in -exclude_supply will also be ignored. In one embodiment, the VAR may be derived as a result of -margin without -voltage area specified. When processing -exclude_supply constraints, in one embodiment, the system will also determine whether the selected supply is in one of the categories that cannot be excluded. In one embodiment, the system tests for exclusion of power supplies which are categorized as:
   Isolation supplies;
   Level Shifter supplies;
   Retention supplies; and
   Repeater supplies.

If the selected supply is in any of those categories, in one embodiment, the system will indicate an error and this -exclude_supply constraint will be ignored. In one embodiment, the error will be MV-297.

In one embodiment, the module will also check whether the -exclude_supply is used in any existing cells/top ports in the netlist. If it is, an error is indicated and this -exclude_supply constraint will be ignored. In one embodiment, the error will be MV-296. In other words, the supply specified with -exclude_supply cannot be specified as physically unavailable.

TABLE 1 illustrates one embodiment of the error codes and associated errors for exclude_supply.

| Error Code | Error |
| --- | --- |
| MV-294 | Neither -exclude_supply nor -supply exists (thus create_secondary_pg_constraints cannot be created) |
| MV-295 | -Layers or -Regions are specified together with -exclude_supply |
| MV-296 | -exclude_supply is used in existing cells/top ports |
| MV-297 | Selected supply for -exclude_supply is in protected category |

In one embodiment, supply net physical availability information will be derived when commit processes all the secondary PG constraints with -exclude.

Once the secondary PG constrains are created and committed, if the user issues another secondary PG constraint, removes a secondary PG constraint, or performs any VA related changes, in one embodiment the system ensures that there is a re-commit during which both VARs and physical availability are recalculated.

If there isn't any secondary PG constraint with -exclude_supply, physical availability is in-sync with UPF availability. Meaning, if in UPF, certain supply is available in the PG VAR, physically, this supply is also available somewhere or everywhere (depending on if there is any secondary PG constraint with -supply) in the corresponding VA.

In one embodiment, the following command will be provided for user to remove the constraints: remove_secondary_pg_placement_constraints {-all secondary_pg_placement_constraint list}. This may be useful to rectify a mistake or change constraints, as it allows the user to remove the constraints that no longer apply and write new ones.

After all constraints for secondary_pg_placement have been created, the user then prompts the tool to internally generate secondary PG placement shapes based on the constraints the user created, if needed, and commit the constraints. The command, in one embodiment, is commit_secondary_pg_placement_shapes.

In addition, or in the alternative, to a command to commit the secondary PG-constraints, the system may also include an auto-commit capability. In one embodiment, secondary PG flow requires the user to explicitly issue a commit command, in one embodiment commit_secondary_pg_placement_constraints, whenever there are any PG constraint changes or any voltage area, physical straps related changes.

Without committing the changes, the tool may still be utilizing an older version of the VAR information, which could be out of sync with the new constraints and physical information. This can be cumbersome or potentially dangerous since users might not be aware that the tool is still working with the outdated derived information. In one embodiment, the system may include an auto_commit of secondary PG constraints in the secondary PG flow. In one embodiment, the auto commit will only happen when there are secondary PG constraints in the design and something has changed one of the constraints, and thus the system needs to be updated, e.g. something has happened that requires commit.

In one embodiment, the system utilizes a global flag in the multi-voltage infrastructure, indicating whether the secondary PG constraints are ready. Being ready means the constraints have been committed and there haven't been any new commands/actions to invalidate the derived information such as changes in VARs and physical availability.

Whenever there are any changes related to voltage area, voltage area shapes, secondary PG constraints or PG straps, the derived VAR might be affected and needs to be re-derived. Many commands and even set_attributes can cause such changes. In one embodiment, the system uses a notification/observation mechanism to capture these changes and invalidate the global flag so that the tool will determine that a commit secondary PG constraints should happen again.

In one embodiment, VARs and physical availability also are invalidated when there are any UPF changes. In other words, whenever UPF becomes not ready, the secondary PG becomes not ready and should be recommitted, after UPF is committed.

For debugging purposes, in one embodiment, in addition to what report_secondary_pg_placement_constraint currently reports, this command also reports whether or not re-commit secondary PG constraints is necessary.

In one embodiment, the system merges shapes if needed, some heuristics may be used (merging based on heuristics). In one embodiment, VARs may be merged if they are partially overlapping to create a bigger VAR. In one embodiment VARs may be merged if they are close enough. In one embodiment, an AppOption can specify how "close" the VARs having the same power sources should be, to be merged. In such an instance, the narrow gap between the closely positioned matching VARs is merged, to create a single VAR. This may be motivated by a wish to reduce the number of VARs due to performance considerations.

In one embodiment, this is a static derivation; if the user changes the PG straps after this, the derived shapes will not change. In one embodiment, if the user issues the command again, the system will perform an derivation of the PG shapes again. In one embodiment, only the VAR(s) affected by the changed strap may be changed, and thus rederived in response to a change.

FIG. 6A illustrates an exemplary layout. The shape for VDD2 as illustrated is {(9 0) (16 6)}. FIG. 6B illustrates another exemplary layout. In this case, two shapes will be derived, one for each of the illustrated straps, {(3 0) (8 10)} and {(13 0) (18 10)}.

In one embodiment, the EDA system may utilize enhancements in data model for supporting PG-aware buffering. Currently, voltage_area_shape (VA-shape) is supported (a voltage_area is consisting of one or multiple voltage_area_shapes), but the VA-shape is not associated with supply information. Novel data model (NDM) enhances the VA-shape data to associate it with one or more secondary power supplies. NDM refers to the Synopsys data model/Synopsys infrastructure. One of skill in the art would understand that similar changes may be made to data models of other systems.

In FIG. 5B, three VA-shapes are illustrated (non-overlapping):

Shape1 550: (left-upper box): supply VDD2
Shape2 560: (right-upper box): supply VDD2

Shape3 570: shape remaining when Shape1 and Shape2 are removed: supply VA1

FIG. 7A illustrates an example showing shapes where the supplies are available, 710, 720, 730. FIG. 7B shows the creation of four VA-shapes based on the supply arrangement in FIG. 7A. The four overlapping shapes are 750, 760, 770, and 780.

To support hierarchical designs, hierarchical representation and flat representation of VA-shape is supported in one embodiment. To support hierarchical design, all APIs are based on hierarchical representation of the VAs and VARs.

In one embodiment, no direct membership is stored in VA-shape. In one embodiment, an multi-voltage infrastructure API is provided to get the list of cells whose secondary PG are connected to specific supply. In one embodiment, the APIs in the multi-voltage infrastructure are provided to get the list of cells whose secondary PG are connected to specific supply.

In one embodiment, check_bufferability is one of the debugging commands that can be used to check and debug multi-voltage buffering behavior. Current check_bufferability command provide -voltage_area so that user can use them to query bufferability inside the specified voltage area.

With secondary PG constraints in place, -voltage_area is not sufficient to cover all buffering information inside a VA, since in different locations bufferability can be very different. To support these secondary PG constraints, in one embodiment, new options are introduced so that a user can get more accurate multi-voltage bufferability information.

In one embodiment, APIs in the multi-voltage infrastructure are provided to get the list of cells whose secondary PG are connected to a specific supply. Multi-voltage bufferability means whether or not it is bufferable from a multi-voltage perspective. For instance, if the required supply net is not present in the given voltage area region/shape, then it is not multi-voltage bufferable in this voltage area shape. There are other factors that potentially can affect bufferability, i.e. congestion, but that is not multi-voltage bufferability related and hence not covered here.

In one embodiment, a user can use -voltage_area_shape to specify a voltage area shape inside a VA. In one embodiment, each voltage area shape/region is given a unique name that can be retrieved by using GUI. Bufferability inside the specified voltage area shape will be the same regardless of different locations.

Figure 7C:
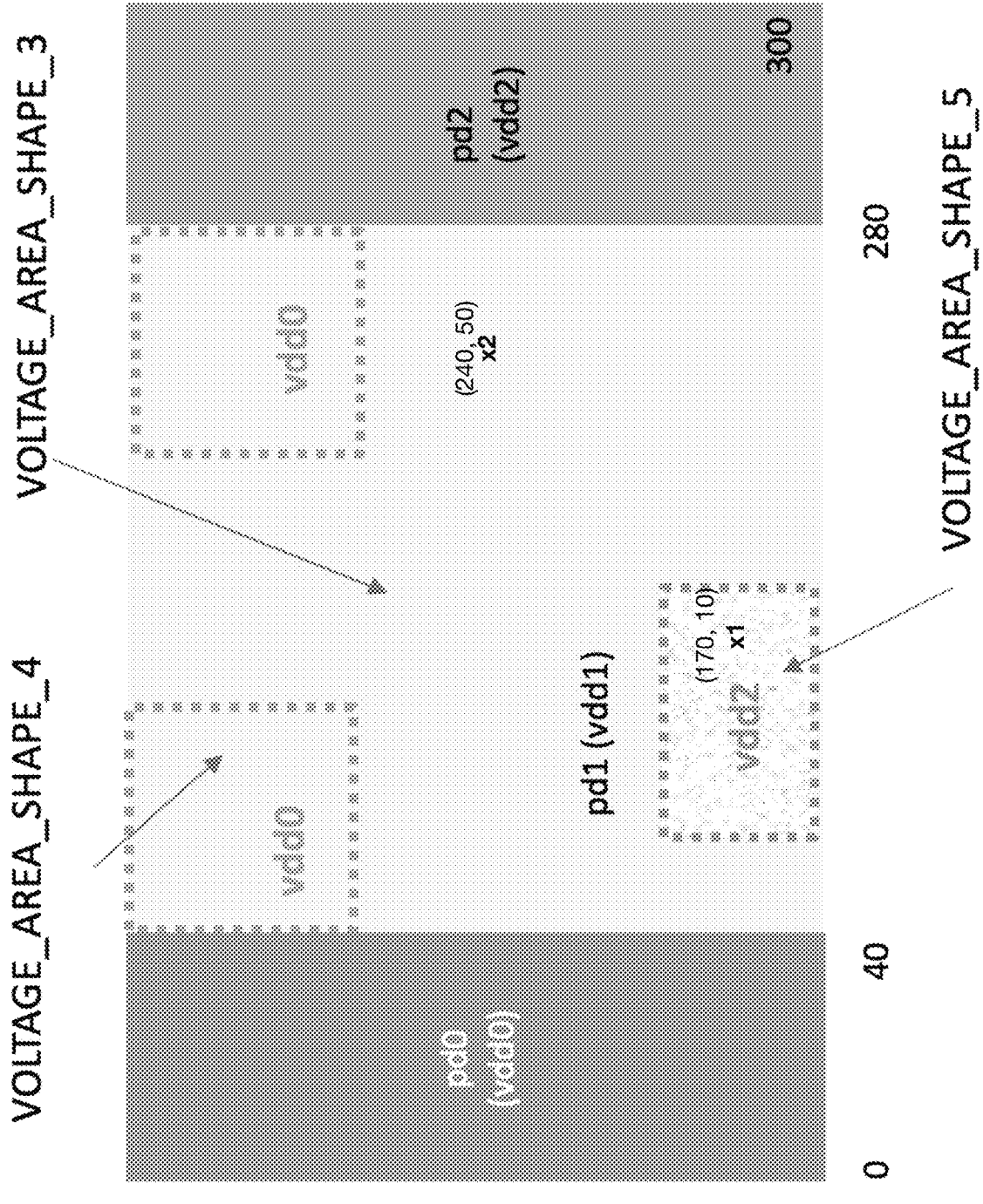
FIG. 7C illustrates another exemplary layout of voltage areas.

In the example illustrated in FIG. 7C, there are three PG VARs in the design. Pd0 has Vdd0 as primary supply, pd1 has Vdd1 as primary supply and pd2 has Vdd2 as primary supply. Inside pd1, secondary PG constraints are defined. The secondary PG constraints show that Vdd0 is only available in the two upper voltage area shapes within pd1, and Vdd2 is available in the bottom green voltage area shape.

Consider a scenario in which there is a driver in area pd0, powered by primary vdd0, and there is a load in pd2 powered by primary vdd2. Check_bufferability is a command which user can use to check whether an element is bufferable, and if it is, what kinds of buffers/inverters the tool will use to buffer between the specified driver and loads in the specified hierarchy and voltage_area shape.

In the example shown in FIG. 7C, since the driver is powered by vdd0 and load is powered by vdd2, in one embodiment the tool will only allow buffering if the buffer can be powered by either vdd0 or vdd2. Check_bufferability will indicate whether or not the element is bufferable based on whether the specified voltage area shape has the required power supply or supplies. So, if the tool is used to check the bufferability of an element in VA5, using command check_bufferability -driver -load -voltage_area_ shape_VOLTAGE_AREA_SHAPE_5, it should return bufferable, because it is ok to buffer with vdd2 and in VOLTAGE_AREA_SHAPE_5, vdd2 is available to use for buffering. However, if the tool is used to check_bufferability -voltage_area shape VOLTAGE_AREA_SHAPE_3, the check_bufferability returns that this is not bufferable, since neither vdd0 nor vdd2 is available in VOLTAGE_AR-EA_SHAPE_3. The limitations of where buffers or other elements may be present are defined by the presence of the various power sources (vdd).

In one embodiment, a user can use the -coord command, to specify a location inside a VA. Bufferability will be calculated based on the specified location. In the example of FIG. 7C, with -coord, user can specify different locations to check bufferability. In one embodiment, the -coord command accepts two coordinates, and determines whether an element at those coordinates is bufferable, and the associated required supply.

If the user issues a check_bufferability -driver -load -coord (170 10) (x1), the check_bufferability should show that it is bufferable and the required supply is vdd2. If the user issues a check_bufferability -driver -load -coord (240 50) (x2), the check_bufferability should show that it is not bufferable because the required supply (vdd2) is not available.

In one embodiment, the existing -voltage_area option will still remain valid regardless of whether secondary PG constraints are defined or not. In the case when there are secondary PG constraints defined, and there are different voltage area shapes with different bufferability, in one embodiment, -voltage_area will return one solution for the entire VA. This information will still be useful, even though it might not be accurate enough, as there are engines being only interested in whether the entire VA is bufferable or not.

For the example shown in FIG. 7C, when user specifies -voltage_area pd1, check_bufferability should show that it is bufferable and the required supply is vdd2. In one embodiment, the required supply can be either vdd0 or vdd2. The system usually preferentially selects the load supply, so vdd2 is indicated as the required supply when a check_bufferability -voltage_area pd1 is issued. the "(vdd1)" next to "pd1" shows the primary supply of the PG VAR. normal (single-rail) cells use this supply. Again, in one embodiment, it only shows one valid solution within the entire voltage area.

Figure 4B:
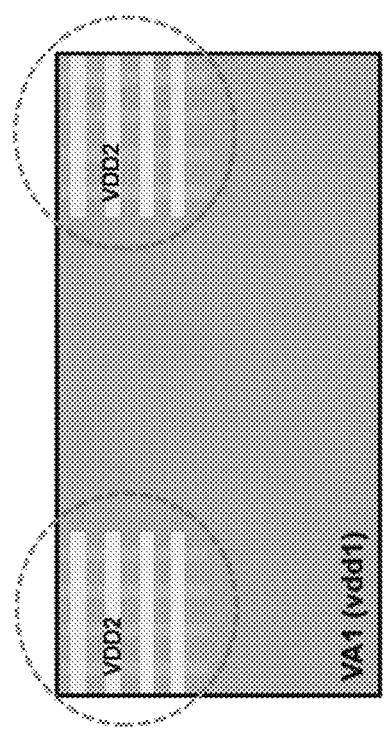
FIG. 4B illustrates a more accurate representation of the presence of secondary power in a voltage area.
Figure 4A:
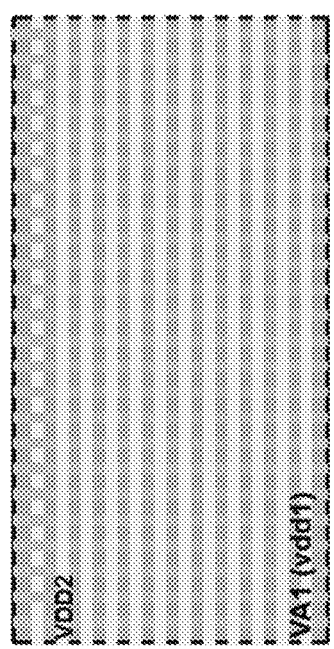
FIG. 4A illustrates one exemplary assumption for the presence of secondary power in a voltage area.

As explained above, current EDA tools that perform placement and routing of cells often evaluate supply availability for cells based on the UPF intent only, not based on physical availability of the supply. This means when a supply is available in a domain, the tools assume the supply is available everywhere in the voltage area (VA) of the domain, as is illustrated in FIG. 4A. In FIG. 4A, VDD2 is shown as available everywhere in VA1, when in reality in most systems, the actual availability is closer to the scenario shown in FIG. 4B, where the VDD2 secondary supply is only available in part of the voltage area.

To reduce routing resources and/or reduce power usage caused by leakage or IR drop, designers may implement partial meshes for the secondary (also referred to as 'backup') supplies in each VA. The secondary supplies, e.g., VDD1, VDD2, . . . VDDn, are available in the domains, but only at secondary PG rails or regions. Therefore, it is not desirable to place cells using these secondary power supplies too far away from the secondary PG rails due to IR drop and EM considerations. The present system solves this issue by enabling a definition of the secondary voltage area availability which can be used by other systems. As shown in FIGS. 10A-10C, this data may be used in placement/legalization, buffering/sizing, and topology generation, as well as other aspects of circuit designs.

Figure 11:
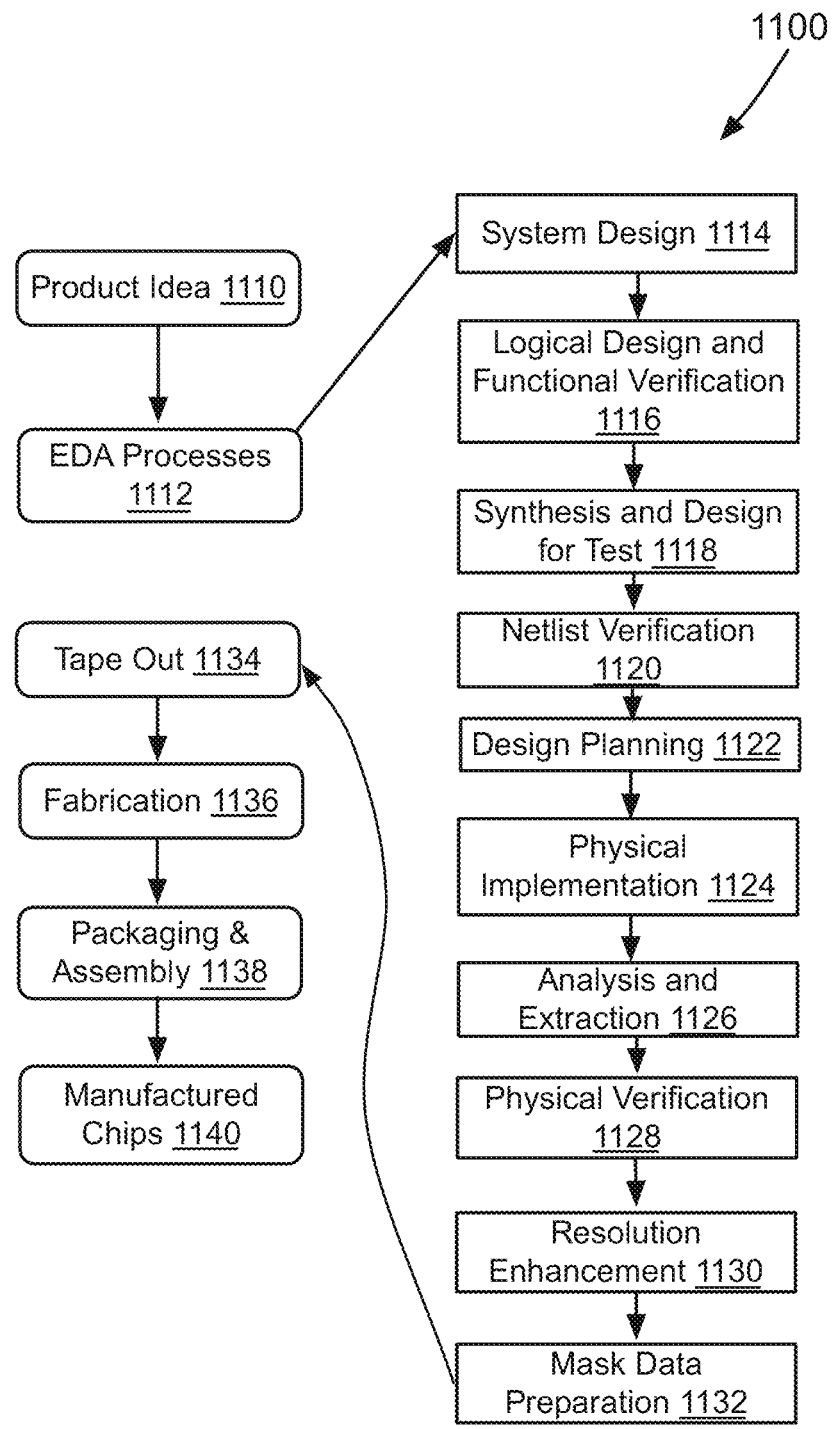
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1300 of FIG. 13) may be used to store the programs and data structures that are used by some or all of the EDA products described herein, and products used for development of cells for the library and for physical and logical design that use the library.

Figure 12:
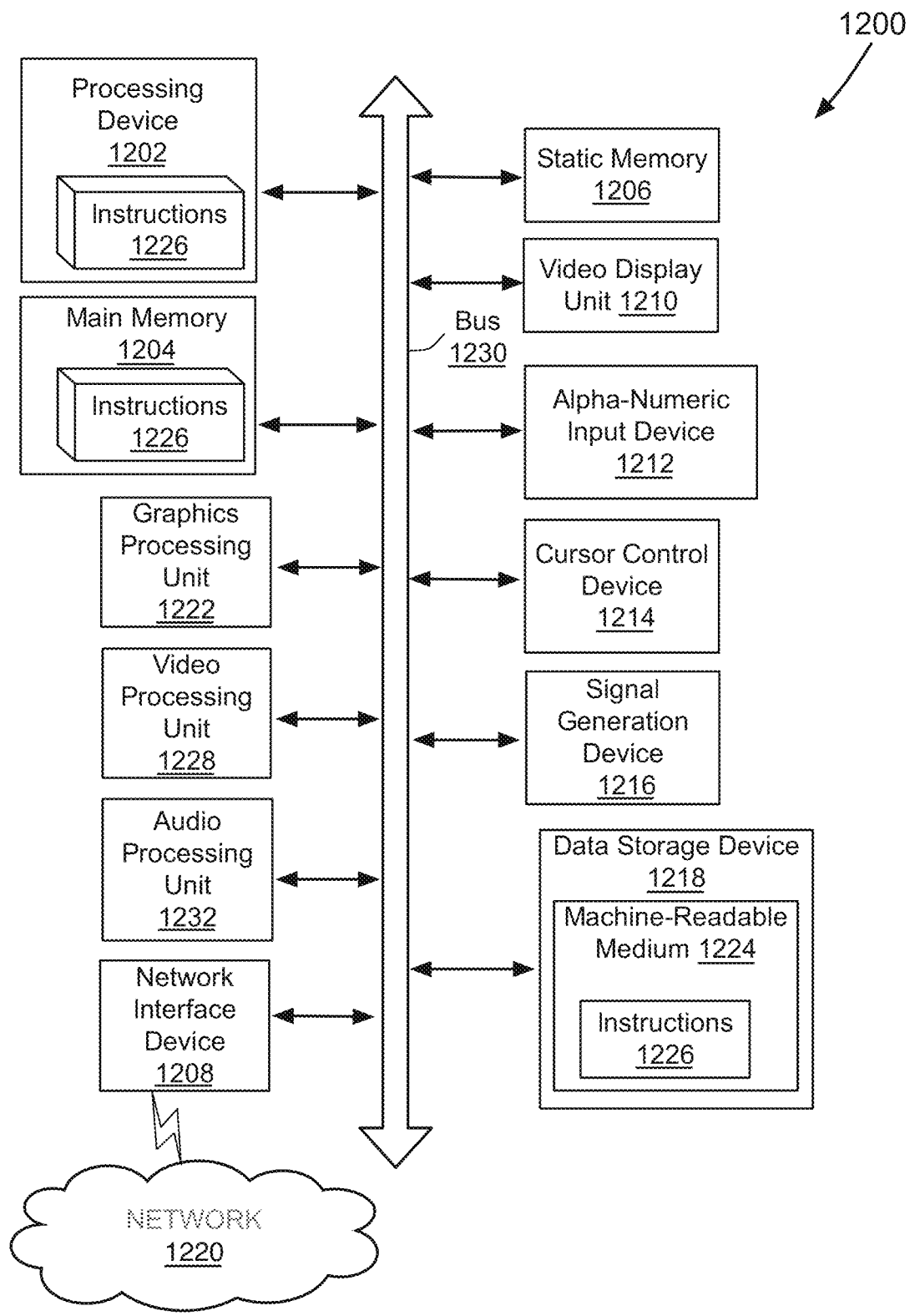
FIG. 12 depicts an abstract diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system to generate a physical layout design of an integrated circuit, the system comprising:
   a memory; and
   a processor, operatively coupled with the memory, to:
      determine a plurality of voltage area regions (VARs), each voltage area region defining a primary power source layout and one or more secondary power source layouts; and
      perform one or more of placing and routing of an element in the layout design of the integrated circuit within a voltage area region of the plurality of voltage area regions based on a respective secondary power source requirements of the element.

2. The system of claim 1, wherein a power/ground voltage area region (PG VAR) of a secondary power source is defined by a location for a power strap and a margin around the location for the power strap, wherein availability of a particular secondary power source is defined based on the PG VAR.

3. The system of claim 2, further comprising:
   a user interface enabling a user to define the margin for the secondary power source.

4. The system of claim 1, wherein the secondary power source comprises one or more of: a backup power supply, a lower power supply having a lower voltage than the primary power source, and a higher power supply having a higher voltage than the primary power source.

5. The system of claim 1, wherein the processor is further to:
   label each of the VARs to indicate, for each power source in the circuit, whether the power source is available or unavailable in the VAR.

6. The system of claim 1, wherein the processor is further to:
   label each VAR with a unique name.

7. The system of claim 1, wherein the processor is further to:
   provide for display of the plurality of VARs to a user via a user interface, wherein each of the plurality of VARs is visually distinguished in a top view of the circuit.

8. The system of claim 1, wherein the processor is further to:
   determine bufferability of a particular element at particular coordinates within the circuit based on secondary PG constraints.

9. The system of claim 1, wherein the processor is further to:
   verify whether a proposed placement of a particular element is valid, based on the power source used by the element and secondary PG constraints.

10. The system of claim 1, wherein the processor is further to:
    ensure that electronic design automation (EDA) systems honor power source availability defined by secondary PG constraints in placement, buffering, and routing.

11. A method to generate a physical layout design of an integrated circuit, the method comprising:
    determine a plurality of voltage area regions, each voltage area region defining a primary power source layout and one or more secondary power source layouts; and
    constraining one or more of placement and routing of an element of the layout design of the integrated circuit based on secondary power/ground (PG) constraints within a voltage area region of the plurality of voltage area regions based on a power requirement of the element.

12. The method of claim 11, further comprising:
    defining a margin around a power strap, wherein availability of a particular secondary power source is defined based on the power strap plus the margin.

13. The method of claim 12, further comprising:
    receiving the definition of the margin from a user.

14. The method of claim 11, wherein the secondary power source comprises one or more of: a backup power supply, a lower power supply having a lower voltage than the primary power source, and a higher power supply having a higher voltage than the primary power source.

15. The method of claim 11, further comprising:
    labeling each of the plurality of voltage area regions to indicate, for each power source in the circuit, whether the power source is available or unavailable in the voltage area region.

16. The method of claim 11, further comprising:
    displaying the plurality of voltage area regions to a user via a user interface, wherein each of the plurality of voltage area regions is visually distinguished in a top view of the circuit.

17. The method of claim 11, further comprising:
    ensuring that electronic design automation (EDA) systems honor power source availability defined by the secondary PG constraints in placement, buffering, and routing.

18. A non-transitory computer readable medium comprising stored instructions, which when executed by a processor, cause the processor to:
    define a portion of a circuit having an available primary power source;
    identify a plurality of power/ground voltage area regions (PG VARs) within a voltage area, the PG VARs defined by an availability of secondary power sources;
    determine a plurality of voltage area regions (VARs), each voltage area region defining the primary power source physical layout and one or more of the secondary power source layouts; and
    ensure that electronic design automation (EDA) systems honor power source availability defined by secondary PG constraints in placement, buffering, and routing.

19. The non-transitory computer readable medium of claim 18, wherein the PG VARs are defined based on a location of a power strap plus a margin around the power strap.

20. The non-transitory computer readable medium of claim 18, wherein the secondary power source comprises one or more of: a backup power supply, a lower power supply having a lower voltage than the primary power source, and a higher power supply having a higher voltage than the primary power source.

* * * * *